United States Patent
Zhang et al.

(10) Patent No.: US 11,148,611 B2
(45) Date of Patent: Oct. 19, 2021

(54) AUTOMOTIVE CAMERA UNIT

(71) Applicant: GM CRUISE HOLDINGS LLC, San Francisco, CA (US)

(72) Inventors: Boyang Zhang, San Mateo, CA (US); Shane McGuire, Redwood City, CA (US); Ming-Hsuan Hsu, Milpitas, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/586,284

(22) Filed: Sep. 27, 2019

(65) Prior Publication Data
US 2021/0094480 A1 Apr. 1, 2021

(51) Int. Cl.
| | |
|---|---|
| *G05D 1/00* | (2006.01) |
| *B60R 11/04* | (2006.01) |
| *H04N 5/225* | (2006.01) |
| *H04N 7/18* | (2006.01) |
| *H04N 5/247* | (2006.01) |

(52) U.S. Cl.
CPC ............ *B60R 11/04* (2013.01); *G05D 1/0011* (2013.01); *H04N 5/2252* (2013.01); *H04N 7/18* (2013.01); *B60R 2300/105* (2013.01); *G05D 2201/0213* (2013.01); *H04N 5/247* (2013.01)

(58) Field of Classification Search
CPC . B60R 11/04; B60R 2300/105; G05D 1/0011; G05D 2201/0213; H04N 5/2252; H04N 7/18; H04N 5/247
See application file for complete search history.

(56) References Cited

U.S. PATENT DOCUMENTS

| | | | | |
|---|---|---|---|---|
| 10,131,201 B1* | 11/2018 | Yeomans | ........... | B60H 1/00821 |
| 10,303,171 B1* | 5/2019 | Brady | ..................... | G08G 1/207 |
| 10,602,035 B2* | 3/2020 | Rukes | ..................... | G03B 17/08 |
| 10,618,474 B2* | 4/2020 | Denny | .................... | B60R 11/04 |
| 2003/0059217 A1* | 3/2003 | Baek | ....................... | B60R 11/04 |
| | | | | 396/427 |
| 2006/0197379 A1* | 9/2006 | Ueno | ................... | B60R 25/2036 |
| | | | | 307/9.1 |

(Continued)

FOREIGN PATENT DOCUMENTS

EP 2955910 A1 12/2015

OTHER PUBLICATIONS

International Search Report and Written Opinion for International Application No. PCT/US2019/068323, dated Apr. 1, 2020, 8 pages.

*Primary Examiner* — Howard D Brown, Jr.
(74) *Attorney, Agent, or Firm* — Polsinelli, PC

(57) ABSTRACT

Various aspects of the subject technology relate to an automotive camera unit. The automotive camera unit comprises a housing comprising an aperture, a lens positioned to receive an optical image through the aperture of the housing, and an image sensor board mounted within the housing, the image sensor board comprising an image sensor configured to convert the optical image into sensor data. The automotive camera unit further includes an image signal processor (ISP) board mounted within the housing and above the image sensor board, the image signal processor board comprising an image signal processor configured to covert the sensor data into image data for use by an automotive system.

16 Claims, 6 Drawing Sheets

(56) References Cited

U.S. PATENT DOCUMENTS

| | | | |
|---|---|---|---|
| 2008/0247184 A1* | 10/2008 | Matsumoto | B60R 25/24 |
| | | | 362/487 |
| 2015/0022718 A1 | 1/2015 | Kano | |
| 2017/0212329 A1* | 7/2017 | Hwang | G02B 9/62 |
| 2017/0305360 A1* | 10/2017 | Zajac | G01C 3/08 |
| 2017/0335606 A1* | 11/2017 | Schatz | G06F 3/04883 |
| 2018/0056942 A1* | 3/2018 | Oikawa | B60R 1/00 |
| 2018/0376037 A1 | 12/2018 | Arai et al. | |
| 2019/0124243 A1 | 4/2019 | Mleczko et al. | |
| 2020/0010051 A1* | 1/2020 | Durnov | B60R 25/252 |
| 2020/0160530 A1* | 5/2020 | Mehnert | G06N 3/084 |
| 2020/0262338 A1* | 8/2020 | Salter | B60Q 1/2661 |

* cited by examiner

AUTOMOTIVE CAMERA UNIT

TECHNICAL FIELD

The present invention generally pertains to sensor units and, more specifically, to camera units used in automotive vehicles.

BACKGROUND

Vehicles of various types operate in a wide variety of environmental conditions. These vehicles increasingly include and rely on various sensors to aid in vehicular operation and navigation. These sensors may also be used to provide users with various features or services. These sensors include, but are not limited to, cameras, light detection and ranging (LIDAR) sensors, or radio detection and ranging (RADAR) sensors.

The various sensors systems included in today's vehicles may include sophisticated and sensitive electronic equipment that operates best in a narrow range of operational limits (e.g., high or low temperatures, moisture, etc.). Unfortunately, vehicles in which the sensor systems are implemented may operate in conditions that cause the sensor systems to exceed their operational limits. For example, automotive image sensors used in automotive cameras typically have a wider range of operational temperature limits than typical image sensors (e.g., up to 115° C.). However, even then, there are situations where those limits are exceeded in conventional automotive cameras.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
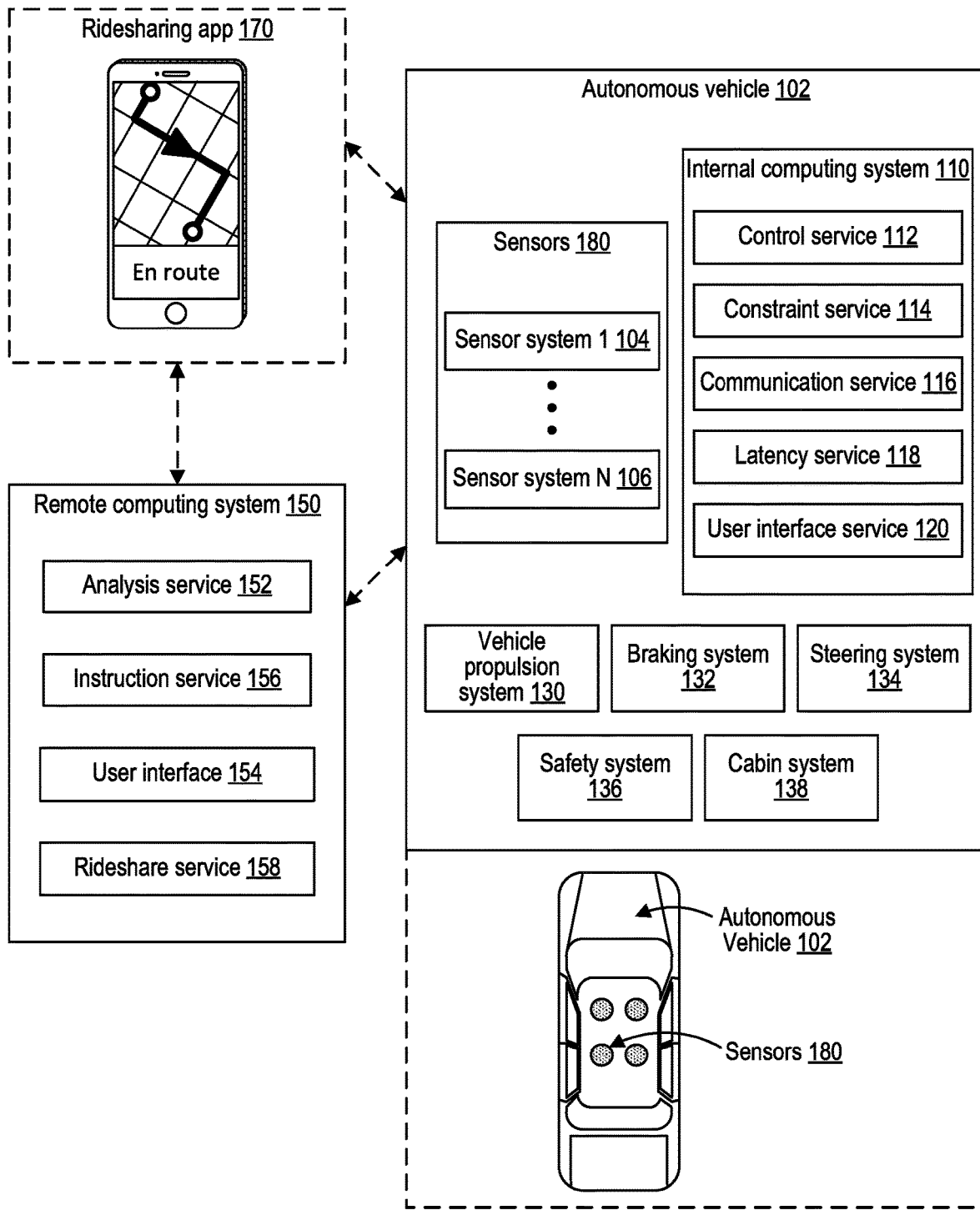
FIG. 1 illustrates an autonomous vehicle and remote computing system architecture, in accordance with various aspects of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Sensor systems installed on vehicles (e.g., automotive vehicles) may have one or more operational limits that specify conditions for optimal sensor performance, tested or guaranteed operation within a specified tolerance, or other operational limits. The operational limits may include, for example, a range of acceptable temperatures. The sensor systems often include an enclosed housing with components that draw power and generate heat. The enclosed housing may trap the heat generated by the components as well as heat provided by the external environment in which the vehicle and/or sensor systems operate. Accordingly, the high ends of ranges of acceptable temperatures specified by the operational limits are often exceeded. This results in sub-optimal performance of the sensor systems, inoperable sensor systems, and/or even the possibility of damage to the sensor systems.

For example, automotive cameras may include image sensors that have a high end of acceptable temperatures (e.g., up to 115° C.). Although different image sensors may be designed with different acceptable temperature ranges, each image sensor will have some temperature above which performance is not guaranteed, performance degrades, or damage may occur. For example, above the high end of the acceptable temperature range, an image sensor may be rendered non-functional or performance of the image sensor may degrade beyond an acceptable level. In extreme cases, damage may even occur to the image sensor. Independent of the specified operational limits, there is also a desire to reduce the temperature surrounding image sensors because higher temperatures may cause higher noise (e.g., Gaussian noise) levels in image data, which results in degraded image quality.

Aspects of the subject technology solve these and other technical problems by providing a sensor unit that reduces the temperatures experienced by the sensor. Some aspects of the subject technology are directed to reducing the temperature of the image sensor by reducing the amount of heat trapped in the vicinity of the image sensor. Furthermore, the amount of heat experienced by the image sensor may be reduced by isolating the image sensor from heat generated by other components. For example, some aspects relate to a camera unit that includes a housing, an image sensor board that includes an image sensor, and an image signal processor (ISP) board. The image signal processor board may be mounted within the housing above the image sensor board such that less heat generated by the image signal processor board is experienced by the image sensor on the image sensor board.

Various embodiments of the subject technology are discussed with respect to an automotive camera unit for illustrative purposes. Other embodiments may relate to other types of camera units, image sensors, and other sensors that are sensitive to heat. These embodiments may be used in various fields and for various purposes. One area in which may be of particular interest is in the field of autonomous vehicles. Autonomous vehicles typically rely heavily on a number of sensors (including cameras) and satisfactory operation of these sensors is of critical importance. These sensors may be mounted in areas on the autonomous vehicle that constrain the ability for heat to dissipate. For example, there may be a lack of space available for cooling mechanisms or the sensors may be mounted to the roof of the vehicle which experiences particularly hot temperatures.

Furthermore, autonomous vehicles may often travel through hot locations and environments that further increase temperatures experienced by the sensors.

FIG. 1 illustrates an autonomous vehicle and remote computing system architecture, in accordance with various aspects of the subject technology. The autonomous vehicle 102 can navigate about roadways with or without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

Note that while the sensors 180 of the vehicle 102 of FIG. 1 are illustrated as uniform and as mounted or otherwise coupled to the roof of the vehicle 102, different types of sensors 180 may be used, and different sensors 180 may be positioned along, or coupled to, different portions of the vehicle 102. For example, one or more sensors may be coupled to the left and right side/wing/door/fender mirrors of the vehicle 102, respectively, while one or more central sensors may be coupled to or hidden behind a front bumper of the vehicle 102. Some sensors 180 may be located along or coupled to the interior of the vehicle, for example behind the windshield or to the interior rear-view mirror. The vehicle 102 may have sensors located along the roof, doors, walls, windows, bumpers, anywhere along the top and/or bottom and/or front and/or left side and/or right side and/or rear of the vehicle, or any combination thereof.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 208, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations. The internal computing system 110 can, in some cases, include at least one computing system, or may include at least a subset of the components discussed with respect to computing systems.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger. The remote computing system 150 can, in some cases, include at least one computing system or may include at least a subset of the components discussed with respect to computing systems.

As noted above, various components of the autonomous vehicle 102 and the remote computing system 150 rely on data from the various sensor systems 180. Various aspects of the subject technology improve the performance and reliability of these sensor systems by reducing temperatures experienced by the sensors and/or reducing the amount of heat trapped in the vicinity of the sensors. These benefits may be achieved using substantially the same amount of space (e.g., without the need for larger sensor unit/housing). In some embodiments, a smaller housing may be used, thus conserving space. Various embodiments of the subject technology are discussed with respect to a camera unit for illustrative purposes. Other embodiments may relate to any other type of sensor that is sensitive to heat.

Figure 2:
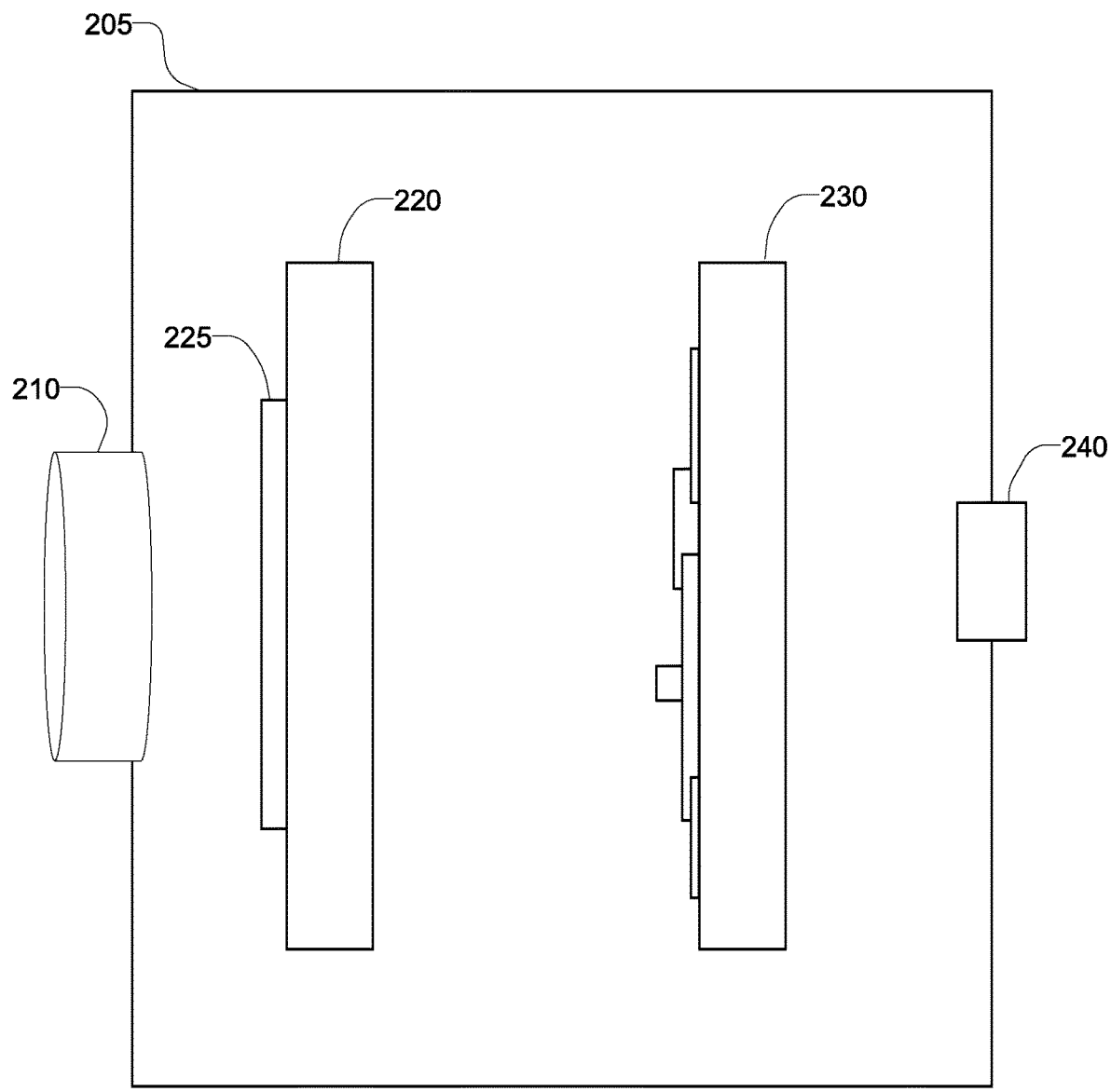
FIG. 2 is a diagram illustrating an example camera unit.

FIG. 2 is a diagram illustrating an example camera unit. The camera unit includes a housing 205, a lens 210, an image sensor board 220 that includes a mounted image sensor 225, an image signal processor board 230, and a connector 240. The lens 210 is configured to allow light to enter the housing 205 and may focus the light onto the image sensor 225 mounted to the image sensor board 220. The image sensor 225 is a sensor configured to detect the light through the lens 215 that forms an optical image and converts the optical image into sensor data. The image signal processor board may have various electronic components mounted to it including an image signal processor, image processing engine, or other image processing unit. The electronic components on the image signal processor board may be configured to process the sensor data and covert the sensor data into image data for use, for example, by the autonomous vehicle 102 of FIG. 1, the remote computing system 150 of FIG. 1, or other system. The processing may include, for example, Bayer transformations, demosaicing, noise reduction, image sharpening, or any other image processing functions. After processing, the connector 240 may provide a means for transferring the image data to another system such as the internal computing system 110 of the autonomous vehicle 102 of FIG. 1.

The image sensor board 220 and the image signal processor board 230 are positioned next to one another in parallel. The image sensor board 220 and the image signal processor board 230 may each generate heat. The heat from the image signal processor board 230 may affect the image sensor board 220. Furthermore, the heat that radiates from the image sensor board 220 and the image signal processor board 230 may accumulate between the image sensor board 220 and the image signal processor board 230 without adequate means for heat dissipation. As a result, the temperature of the image sensor board 220 may climb to levels that exceed operation limits or cause the performance of the image sensor board 220 to degrade.

Aspects of the subject technology mitigate the amount of heat the image sensor board experiences from the image signal processor board and thereby reduces the temperatures experienced by the image sensor board. As a result, operational limits of the image sensor are less likely to be exceeded, the performance of the image sensor is less likely to degrade, and resulting images will experience less noise and better image quality.

Figure 3:
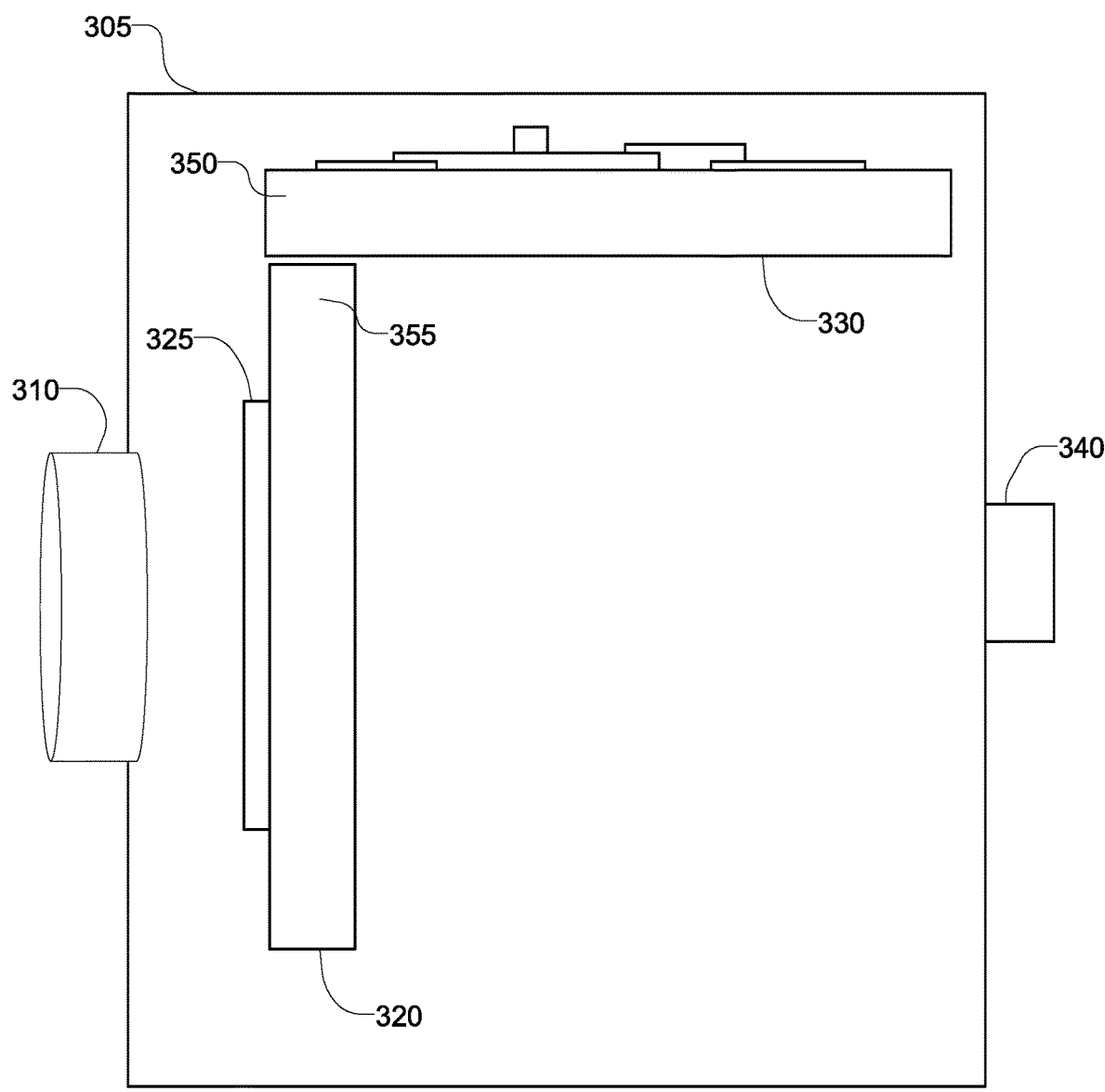
FIG. 3 is a diagram illustrating an example camera unit, in accordance with various aspects of the subject technology.

FIG. 3 is a diagram illustrating an example camera unit, in accordance with various aspects of the subject technology. The camera unit may include a housing 305 that includes an aperture. One or more portions of the housing 305 may be made of a heat dissipating material such as a metal or metal alloy. In some embodiment copper, aluminum, and/or stainless steel may be used. A lens or lens unit 310 may be positioned within the housing 305 to receive light (e.g., an optical image) through the aperture of the housing 305.

An image sensor board 320 is mounted within the housing 305 and includes a mounted image sensor 325. The image sensor 325 is configured to convert the optical image received through the lens 310 into sensor data. Both the lens 310 and the image sensor board 320 are positioned vertically in the housing 305 and in parallel. The image sensor 325 may be aligned with the lens 310 in order to receive an optical image through the lens 310. An image signal processor board 330 is also mounted within the housing 330 above the image sensor board 320. The image signal processor board 330 includes electronics, such as an image signal processor configured to covert the sensor data into image data for use by an automotive system. In some embodiments, the image sensor board 320 and the image signal processor board 330 may be printed circuit boards (PCBs). The camera unit also includes a connector 340 that provides an interface between the camera unit and an external system such as the internal computing system 110 of the autonomous vehicle 102 of FIG. 1.

By placing the image signal processor board 330 above the image sensor board 320, heat generated by the image signal processor board 330 is less likely to affect the image sensor board 320. Furthermore, the heat generated by the image signal processor board 330 is likely to dissipate upwards as hot air rises and away from the image sensor board 320. As shown in FIG. 3, the image signal processor board 330 positioned horizontally in the housing 305. The image signal processor board 330 may be positioned perpendicularly with respect to the image sensor board 320. However, the orientation of the image signal processor board 330 and the image sensor board 320 need not be perpendicular or in a 90 degree orientation. In other embodiments, a plane of formed by the image signal processor board 330 and a plane of the image sensor board 320 may intersect at a point, forming an angle between 45 and 135 degrees.

According to some embodiments, the image sensor board 320 and/or the image signal processor board 330 are mounted to an interior of the housing 305. However, in other embodiments, a chassis may be mounted to the interior of the housing 305 and the image sensor board 320 and/or the image signal processor board 330 are mounted to the chassis. Also, as shown in FIG. 3, one end 350 of the image signal processor board 330 may abut an end 355 of the image sensor board 320. However, in other embodiments, other configurations may be used.

Figure 4:
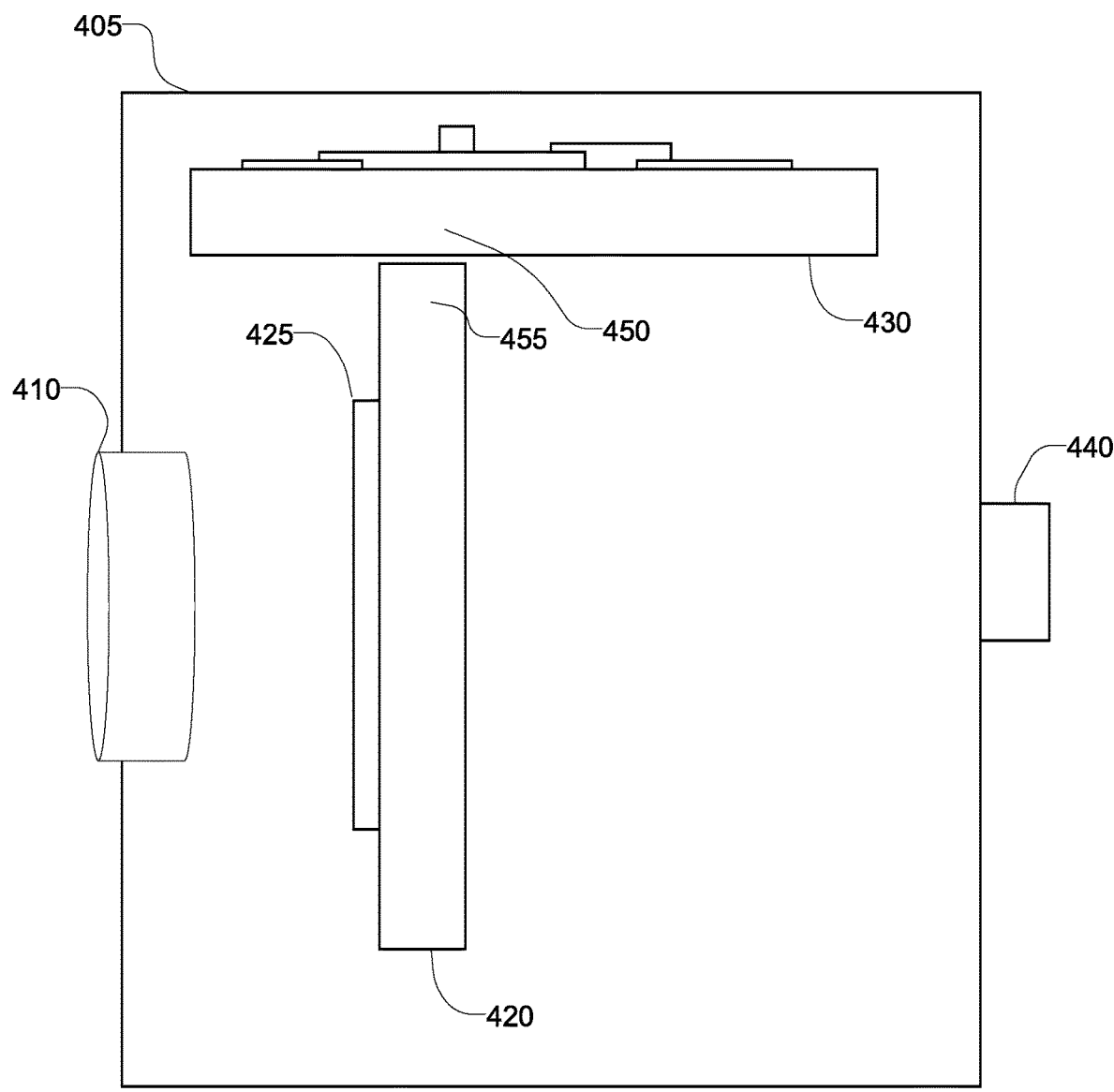
FIG. 4 is a diagram illustrating an example camera unit, in accordance with various aspects of the subject technology.

For example, FIG. 4 is a diagram illustrating an example camera unit, in accordance with various aspects of the subject technology. The camera unit includes a housing 405, a lens 410, an image sensor board 420 with an image sensor 425, and an image signal processor (ISP) board 430 mounted within the housing 405 and above the image sensor board. The camera unit also includes a connector 440 that provides an interface between the camera unit and an external system such as the internal computing system 110 of the autonomous vehicle 102 of FIG. 1. As shown in FIG. 4, an end 455 of the image sensor board 420 abuts an intermediate section 450 of the image signal processing board 430. Although the image signal processor board 430 is shown positioned perpendicularly with respect to the image sensor board 420, other orientations are possible.

Figure 5:
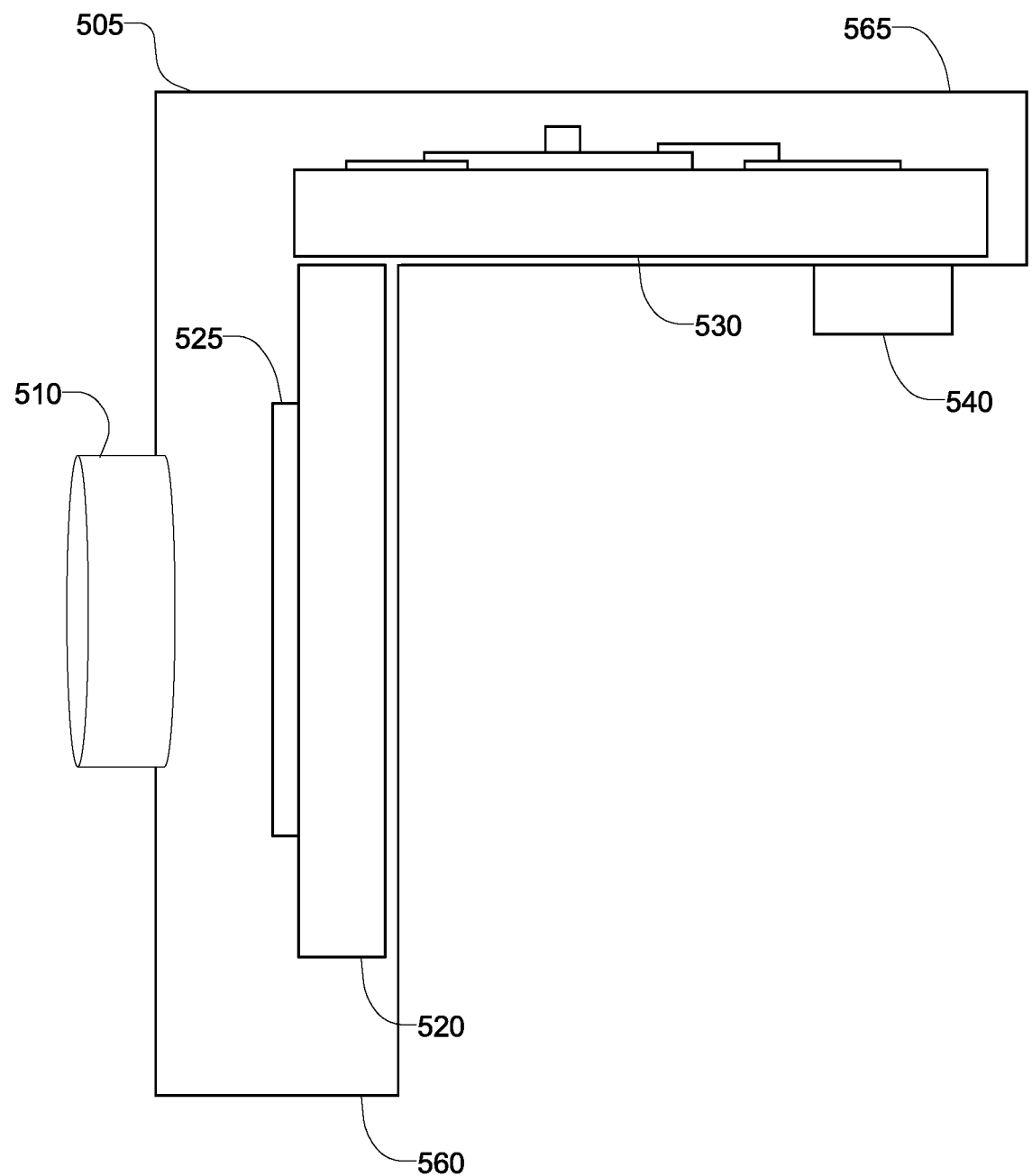
FIG. 5 is a diagram illustrating an example camera unit, in accordance with various aspects of the subject technology.

FIG. 5 is a diagram illustrating an example camera unit, in accordance with various aspects of the subject technology. The camera unit includes a housing 505, a lens 510, an image sensor board 520 with an image sensor 525, and an image signal processor (ISP) board 530 mounted within the housing 505 and above the image sensor board. The camera unit also includes a connector 540 that provides an interface between the camera unit and an external system such as the internal computing system 110 of the autonomous vehicle 102 of FIG. 1.

The housing 505 in FIG. 5 includes a first section 560 configured to fit the image sensor board 520 and a second section 565 configured to fit the image signal processor board 530. The first vertical section 560 surrounds the image sensor board 520, covers the length of the image sensor board 520, and provides an increased surface area for heat from the image sensor board 520 to dissipate. Similarly, second horizontal section 565 surrounds the image signal processor board 530, covers the length of the image signal processor board 530, and provides an increased surface area for heat from the image signal processor board 530 to dissipate. Such a configuration allows for improved heat dissipation as less heat from the image sensor board 520 and/or the image signal processor board 530 is enclosed within the housing and there is more surface area for heat to dissipate.

Figure 6:
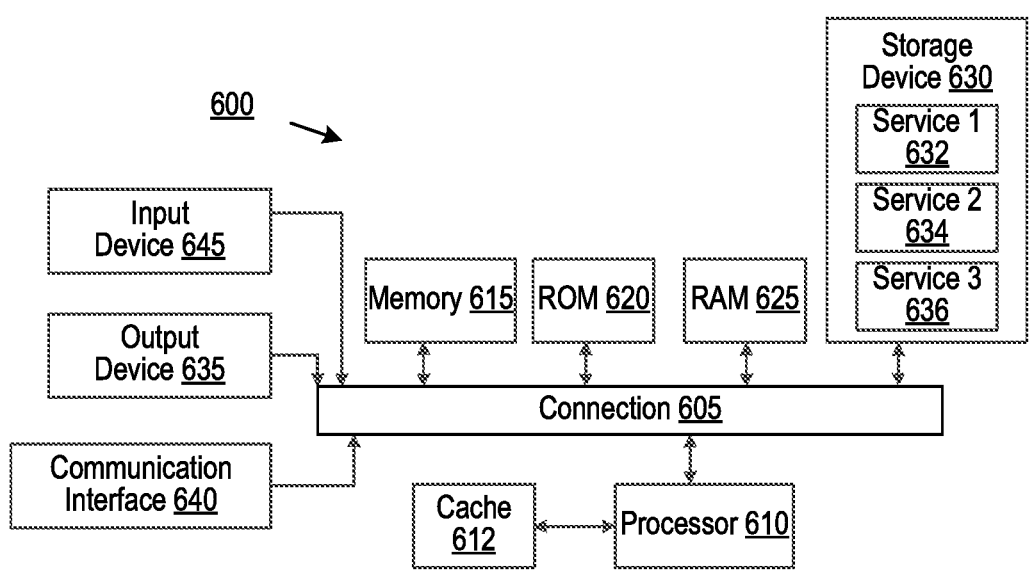
FIG. 6 shows an example of computing system, in accordance with various aspects of the subject technology.

FIG. 6 shows an example of computing system 600, which can be for example any computing device making up internal computing system 110, remote computing system 150, camera unit, sensor unit, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An automotive camera unit comprising:
   a housing comprising an aperture;
   a lens positioned to receive an optical image through the aperture of the housing;
   an image sensor board mounted within the housing, the image sensor board comprising an image sensor configured to convert the optical image into sensor data; and
   an image signal processor (ISP) board mounted within the housing and perpendicularly with respect to the image sensor board, the image signal processor board comprising an image signal processor configured to covert the sensor data into image data for use by an automotive system, wherein the housing comprises a first section configured to fit the image sensor board and a second section configured to fit the image signal processor board, and wherein a plane of the image signal processor board and a plane of the image sensor board intersect forming an angle between 45 and 135 degrees.

2. The automotive camera unit of claim 1, wherein the image signal processor board is mounted above the image sensor board.

3. The automotive camera unit of claim 2, further comprising a connector configured to transmit the image data to the automotive system.

4. The automotive camera unit of claim 2, wherein an end of the image signal processor board abuts an end of the image sensor board.

5. The automotive camera unit of claim 1, wherein an end of the image sensor board abuts an intermediate section of the image signal processor board.

6. The automotive camera unit of claim 1, further comprising a chassis mounted to an interior of the housing, wherein the image sensor board is mounted to the chassis and wherein the image signal processor board is mounted to the chassis.

7. The automotive camera unit of claim 1, wherein the image sensor board is mounted to an interior of the housing and wherein the image signal processor board is mounted to the interior of the housing.

8. The automotive camera unit of claim 1, wherein the housing comprises a heat dissipating material.

9. The automotive camera unit of claim 1, wherein the automotive system is an autonomous vehicle system.

10. A camera unit comprising:
    a housing comprising an aperture;
    a lens positioned to receive an optical image through the aperture of the housing;
    an image sensor board mounted within the housing, the image sensor board comprising an image sensor configured to convert the optical image into sensor data; and
    an image signal processor (ISP) board mounted within the housing and above the image sensor board, the image signal processor board comprising an image signal processor configured to covert the sensor data into image data for use by an automotive system, wherein the housing comprises a first section configured to fit the image sensor board and a second section configured to fit the image signal processor board, and wherein a plane of the image signal processor board and a plane of the image sensor board intersect forming an angle between 45 and 135 degrees.

11. The camera unit of claim 10, wherein the image signal processor board is mounted perpendicularly with respect to the image sensor board.

12. The camera unit of claim 10, wherein a plane of the image signal processor board and a plane of the image sensor board intersect.

13. The camera unit of claim 10, wherein an end of the image signal processor board abuts an end of the image sensor board.

14. An automotive sensor unit comprising:
    a housing comprising an aperture;
    a sensor board mounted within the housing, the sensor board comprising a sensor configured to generate sensor data; and
    a signal processor board mounted within the housing and perpendicularly with respect to the sensor board, the signal processor board comprising a signal processor configured to process the sensor data for use by an automotive system, wherein the housing comprises a first section configured to fit the sensor board and a second section configured to fit the signal processor board, and wherein a plane of the signal processor board and a plane of the sensor board intersect forming an angle between 45 and 135 degrees.

15. The automotive sensor unit of claim 14, wherein an end of the signal processor board abuts an end of the sensor board.

16. The automotive sensor unit of claim 14, further comprising a connector configured to transmit the sensor data to the automotive system, and wherein the automotive system is an autonomous vehicle system.

* * * * *